US006339115B1

(12) United States Patent
Aoki et al.

(10) Patent No.: US 6,339,115 B1
(45) Date of Patent: Jan. 15, 2002

(54) MOLDING COMPOSITION

(75) Inventors: Katsutoshi Aoki; Takashi Yamaguchi; Kuniyasu Kawabe, all of Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/633,190

(22) Filed: Aug. 4, 2000

(30) Foreign Application Priority Data

Aug. 6, 1999 (JP) ............................................. 11-224458

(51) Int. Cl.[7] ........................... C08K 3/40; C08L 67/07; C08L 77/12
(52) U.S. Cl. .................... 523/513; 523/500; 523/527; 525/46; 525/421
(58) Field of Search .................................. 523/513, 527, 523/500; 525/46, 421

(56) References Cited

U.S. PATENT DOCUMENTS 4,524,178 A * 6/1985 Hefner, Jr. et al. ......... 523/508

FOREIGN PATENT DOCUMENTS

| JP | A5755962 | 4/1982 |
| JP | B2231090 | 7/1990 |
| JP | A5169475 | 7/1993 |
| JP | A71666 | 1/1995 |

* cited by examiner

Primary Examiner—Tae H. Yoon
(74) Attorney, Agent, or Firm—Birch, Stewart, Kolasch & Birch, LLP

(57) ABSTRACT

A molding composition comprising (A) a fibrous material, (B) a nonlinear unsaturated polyester and/or (C) a nonlinear unsaturated polyester-polyamide, and (D) a radical generator, and a molded article obtained therefrom.

6 Claims, No Drawings

MOLDING COMPOSITION

BACKGROUND OF THE INVENTION

1. Field of the Invention

This invention relates to a molding composition suitable for production of cores of automobile interior materials, sound absorbers of air conditioners, fiber-reinforced plastics (hereinafter "FRP"), constructional sound insulators, and the like.

2. Description of the Related Art

Cores of automobile interior materials, sound absorbers of air conditioners, FRP, constructional sound insulators, and the like are produced from molding compounds mainly comprising fiber, a phenolic resin, and an amine curing agent to secure sufficient strength (see, for example, JP-A-57-55962 and JP-A-7-1666). However, phenolic resins react thermally to produce formaldehyde, and the amine curing agent has the problem of smell.

Powdered molding compounds comprising a diallyl phthalate prepolymer and/or a crystalline unsaturated polyester resin, fiber, and a curing agent are known (see JP-A-5-169475). However, the diallyl phthalate prepolymer has a low iodine value and fails to achieve a high crosslinking density so that the resulting molded article has insufficient strength.

A molding composition comprising a non-crystalline unsaturated polyester and an ethylenically unsaturated group-containing monomer having compatibility with the unsaturated polyester and a molding composition further comprising a polymerization initiator are also known (see JP-B-2-31090). Acting as a crosslinking agent, the ethylenically unsaturated group-containing monomer compatible with an unsaturated polyester brings about improved strength but has the problems of smell and safety.

SUMMARY OF THE INVENTION

An object of the present invention is to provide a molded article having sufficient strength and heat resistance for practical use and improved safety and smell.

Another object of the present invention is to provide a molding composition suitable for producing such a molded article.

The present invention relates to a molding composition comprising (A) a fibrous material, at least one of (B) a nonlinear unsaturated polyester and (C) a nonlinear unsaturated polyester-polyamide, and (D) a radical generator. The invention also relates to a molded article obtained by molding the molding composition.

According to the present invention, use of components (B) and/or (C) provides a molded article with sufficient strength for practical use and free from the problems of formaldehyde generation and smell.

DETAILED DESCRIPTION OF THE INVENTION

The fibrous material as component (A) is not particularly limited and includes inorganic fibers such as glass fiber and organic fibers such as synthetic resin fibers and natural fibers. Organic fibers of cotton, flax, wool, silk, nylon, etc. are preferred from the standpoint of flexibility and heat insulation of a molded article. Component (A) can be used in the form of yarn or fabric, either woven or nonwoven.

The nonlinear unsaturated polyester as component (B) is not particularly limited as long as it is nonlinear. From the viewpoint of molding properties in high temperature and strength of molded articles, crystalline polyesters are preferred. The raw monomers providing component (B) are not particularly limited and include di- or higher polyhydric alcohol components, di- or higher polycarboxylic acid components, such as carboxylic acids or anhydrides or esters thereof, and addition polymerizable unsaturated group-containing monomers.

Preferred dihydric alcohol components include a bisphenol A-alkylene oxide adduct (containing 2 or 3 carbon atoms in the alkylene moiety; average mole number of alkylene oxide added: 1 to 10), ethylene glycol, propylene glycol, 1,6-hexanediol, 1,4-butanediol, bisphenol A, and hydrogenated bisphenol A.

Preferred tri- or higher polyhydric alcohol components include sorbitol, 1,4-sorbitan, pentaerythritol, glycerol, and trimethylolpropane.

The dicarboxylic acid components include various dicarboxylic acids and succinic acid which is substituted with an alkyl or alkenyl group having 1 to 20 carbon atoms, anhydrides of these acids, and alkyl esters of these acids having 1 to 12 carbon atoms in the alkyl moiety thereof. Maleic anhydride, fumaric acid, terephthalic acid, and $C_{2-20}$ alkenyl-substituted succinic anhydride are preferred.

Preferred tri- or higher polycarboxylic acids include 1,2,4-benzenetricarboxylic acid (trimellitic acid), an anhydride thereof, and an alkyl ester thereof having 1 to 12 carbon atoms in the alkyl moiety.

The addition polymerizable unsaturated group-containing monomers include fumaric acid, maleic acid, maleic anhydride, and itaconic acid, with fumaric acid and maleic anhydride being preferred.

The nonlinear unsaturated polyester as component (B) can be prepared by allowing a mixture comprising the above-described monomers to react at 150 to 250° C. for 5 to 20 hours in a nitrogen atmosphere. It is acceptable to use a monohydric alcohol component or a monocarboxylic acid component for molecular weight regulation and a commonly employed catalyst for esterification, such as dibutyltin oxide, for reaction acceleration.

The nonlinear unsaturated polyester-polyamide as component (C) is not particularly restricted as long as it is nonlinear. From the standpoint of molding properties in high temperature and strength of molded articles, crystalline polymers are preferred. Component (C) can be obtained from a monomer mixture comprising an amine monomer in addition to the monomers used to prepare component (B). Examples of the amine monomers include various known polyamines, aminocarboxylic acids, amino alcohols, and lactams. Preferred amine monomers are ethylenediamine, hexamethylenediamine, xylylenediamine, and ε-caprolactam.

The amine monomer is preferably present in component (C) in a proportion of 1.0 to 20.0 mol %.

It is preferred for components (B) and (C) to contain 0.1 to 30% by weight, particularly 0.1 to 20% by weight, of a tri- or higher polyhydric alcohol and/or a tri- or higher polycarboxylic acid derivative based on the total constituent monomers. Such a molding composition exhibits satisfactory molding properties to provide a uniform molded article with further improved strength in ambient temperature and high temperature.

From the viewpoint of molded article strength, it is also preferred for components (B) and (C) to contain 20% by weight or more, particularly 30% by weight or more, of at least one addition polymerizable unsaturated group-containing monomer based on the total constituent monomers.

One or more kinds of component (B) and/or one or more kinds of component (C) can be used in combination.

It is preferred for components (B) and (C) to have an iodine value of 40 or greater, particularly 45 or greater, especially 60 or greater, to secure strength of molded articles.

Of the polymers as component (B) or (C) those having crystallinity preferably have a melting point of 90° to 160° C. as a main peak top temperature of the DSC curve measured at a heating rate of 10° C./min in an onset method and a melt viscosity of 100 Pa·s or less at a temperature higher than that melting point by 20° C.

The radical generator as component (D) include peroxides, persulfates, and azo compounds, with peroxides and persulfates being preferred. Lauroyl peroxide, dibutyl peroxide, dicumyl peroxide, and sodium persulfate are particularly preferred. It is preferred for the radical generator to have a half-life of 7 days or longer at 40° C. to secure the preservability, stability and the like of the molding composition. Taking the molding time into consideration, a still preferred half-life is within 10 minutes at 250° C.

If desired, the molding composition of the invention can contain known additives, such as a curing aid (e.g., diallyl phthalate or triallyl phthalate), a lubricant (e.g., amide wax, synthetic wax, latices, or fatty acid metal salts), a filler (e.g., talc, calcium carbonate or aluminum hydroxide), and so forth.

The molding composition of the invention is prepared by compounding the above-described components in a Henschel mixer, a fluidized bed mixer, and the like.

The compounding ratios of the components are not particularly limited as long as the molded articles obtained therefrom have sufficient strength for practical use. A preferred content of component (A) is 29 to 99% by weight, particularly 50 to 98.9% by weight, based on the total composition from the standpoint of the specific gravity and strength of molded articles. A preferred total content of component (B) and component (C) is 0.5 to 70% by weight, particularly 0.9 to 50% by weight, based on the total composition from the viewpoint of the strength and specific gravity of molded articles. A preferred content of component (D) is 0.1 to 30% by weight, particularly 0.1 to 20% by weight, based on the total composition from the standpoint of the strength and specific gravity of the molded articles. The amounts of the additives optionally incorporated, such as a catalyst, a curing aid, a lubricant, and a filler, can be selected appropriately to obtain the desired effects.

Known molding methods can be adopted with no particularly restriction for obtaining molded articles of the present invention from the above-mentioned molding composition, such as compression molding, laminated molding, injection molding, and extrusion. Prior to molding, the composition may be subjected to remaining heat or heating.

The molded article according to the invention preferably has a bend strength of 100 kg/cm$^2$ or more, particularly 120 kg/cm$^2$ or more, as measured in accordance with JIS K6911. That is, the molded article exhibits sufficient strength for practical use and also satisfactory heat resistance and therefore suited for use as cores of automobile interior materials, sound absorbers of air conditioners, FRP, constructional sound insulators, and the like.

The present invention will now be illustrated in greater detail with reference to Preparation Examples and Examples, but it should be understood that the invention is not limited thereto.

In Preparation Examples, the softening point was measured with a Koka type flow tester manufactured by Shimadzu Corp. under conditions of a load of 20 kgf, an orifice diameter of 10 mm, an orifice length of 1 mm, and a rate of temperature rise of 3° C./min. The temperature at which half the amount of a sample flows out of the orifice was taken as a softening point. The melting point was measured with a differential scanning calorimeter manufactured by Seiko Denshi K. K. at a rate of temperature rise of 10° C./min and calculated by the onset method.

PREPARATION EXAMPLE 1

Ethylene glycol (93 g, 1.5 mol), 1215 g (13.5 mol) of 1,4-butanediol, 1650 g (14.3 mol) of fumaric acid, 162 g (1 mol) of trimellitic anhydride, and 1.5 g of dibutyltin oxide were allowed to react at 160° C. for 4 hours in a nitrogen atmosphere. The temperature was raised up to 200° C., and the reaction was continued under atmospheric pressure for 1 hour and then under reduced pressure of 9.33 kPa for another 1 hour. The resulting resin was found to be a crystalline nonlinear unsaturated polyester resin having an iodine value of 112 and a softening point of 115° C. (melting point: 109° C.; melt viscosity at 129° C.: 18 Pa·s). The resin was used in Example 1.

PREPARATION EXAMPLE 2

1,4-Butanediol (1350 g, 15 mol), 1650 g (14.3 mol) of fumaric acid, 162 g (1 mol) of trimellitic anhydride, and 1.5 g of dibutyltin oxide were allowed to react at 160° C. for 4 hours in a nitrogen atmosphere. The temperature was raised up to 200° C., and the reaction was continued under atmospheric pressure for 1 hour and then under reduced pressure of 9.33 kPa for another 1 hour. The resulting resin was found to be a crystalline nonlinear unsaturated polyester resin having an iodine value of 108 and a softening point of 128° C. (melting point: 127° C.; melt viscosity at 147° C.: 9 Pa·s). The resin was used in Example 2.

PREPARATION EXAMPLE 3

1,4-Butanediol (1300 g, 14.5 mol), 1740 g (15 mol) of fumaric acid, and 40 g (0.5 mol) of glycerol were allowed to react at 160° C. for 4 hours in a nitrogen atmosphere. The temperature was raised up to 200° C., and the reaction was continued under atmospheric pressure for 1 hour and then under reduced pressure of 9.33 kPa for another 1 hour. The resulting resin was found to be a crystalline nonlinear unsaturated polyester resin having an iodine value of 120 and a softening point of 128° C. (melting point: 127° C.; melt viscosity at 147° C.: 16 Pa·s). The resin was used in Example 3.

PREPARATION EXAMPLE 4

1,4-Butanediol (1215 g, 13.5 mol), 220 g (1.5 mol) of 1,6-hexanediol, 135 g (1.5 mol) of succinic acid, 1330 g (11.3 mol) of fumaric acid, and 243 g (1.5 mol) of trimellitic anhydride were allowed to react at 160° C. for 4 hours in a nitrogen atmosphere. The temperature was raised up to 200° C., and the reaction was continued under atmospheric pressure for 1 hour and then under reduced pressure of 9.33 kPa for another 1 hour. The resulting resin was found to be a crystalline nonlinear unsaturated polyester resin having an iodine value of 95 and a softening point of 128° C. (melting point: 127° C.; melt viscosity at 147° C.: 28 Pa·s). The resin was used in Example 4.

PREPARATION EXAMPLE 5

A bisphenol A-PO adduct (1925 g; 5.5 mol), 580 g (5.0 mol) of fumaric acid, 81 g (0.5 mol) of trimellitic anhydride, and 1.5 g of dibutyltin oxide were allowed to react at 160° C. for 4 hours in a nitrogen atmosphere. The temperature was raised up to 200° C., and the reaction was continued under atmospheric pressure for 1 hour and then under reduced pressure of 9.33 kPa for another 1 hour. The resulting resin was found to be a noncrystalline nonlinear unsaturated polyester resin having an iodine value of 41, a softening point of 110° C., and a glass transition temperature of 55° C. The resin was used in Example 5.

PREPARATION EXAMPLE 6

Ethylene glycol (93 g, 1.5 mol), 1215 g (13.5 mol) of 1,4-butanediol, 136 g (1 mol) of m-xylylenediamine, 1881 g (16.3 mol) of fumaric acid, and 1.5 g of dibutyltin oxide were allowed to react at 160° C. for 4 hours in a nitrogen atmosphere. The temperature was raised up to 200° C., and the reaction was continued under atmospheric pressure for 1 hour and then under reduced pressure of 9.33 kPa for another 1 hour. The resulting resin was found to be a crystalline nonlinear unsaturated polyester-polyamide resin having an iodine value of 133 and a softening point of 116° C. (melting point: 110° C.; melt viscosity at 130° C.: 18 Pa·s). The resin was used in Example 6.

COMPARATIVE PREPARATION EXAMPLE 1

Ethylene glycol (93 g, 1.5 mol), 1215 g (13.5 mol) of 1,4-butanediol, 1816 g (15.75 mol) of fumaric acid, and 1.5 g of dibutyltin oxide were allowed to react at 160° C. for 4 hours in a nitrogen atmosphere. The temperature was raised up to 200° C., and the reaction was continued under atmospheric pressure for 1 hour and then under reduced pressure of 9.33 kPa for another 1 hour. The resulting resin was found to be a crystalline linear unsaturated polyester resin having an iodine value of 115 and a softening point of 112° C. (melting point: 104° C.; melt viscosity at 124° C.: 10.5 Pa·s). The resin was used in Comparative Example 1.

COMPARATIVE PREPARATION EXAMPLE 2

1,4-Butanediol (1350 g, 15 mol), 1816 g (15.75 mol) of fumaric acid, and 1.5 g of dibutyltin oxide were allowed to react at 160° C. for 4 hours in a nitrogen atmosphere. The temperature was raised up to 200° C., and the reaction was continued under atmospheric pressure for 1 hour and then under reduced pressure of 9.33 kPa for another 1 hour. The resulting resin was found to be a crystalline linear unsaturated polyester resin having an iodine value of 112 and a softening point of 125° C. (melting point: 117° C.; melt viscosity at 137° C.: 20 Pa·s). The resin was used in Comparative Example 2.

EXAMPLES 1 TO 6 AND COMPARATIVE EXAMPLES 1 TO 2

Each of the resins prepared in Preparation Examples and Comparative Preparation Examples, being ground to powder having a particle size of 30 to 200 μm (component (B) or component (C)), a fibrous material in the form of pieces of threads (component (A)), and dicumyl peroxide as a peroxide type radical generator (component (D)) were compounded in the ratio shown in Table 1 below to prepare a molding compound.

The compound was put in between mirror-finished stainless steel plates, placed in a hot press set at 190° C. and hot pressed under a contact pressure of 15 kgf/cm$^2$ for 1 minute to obtain a 20 cm long, 5 cm wide and 6 mm thick plate.

Each plate was subjected to normal temperature bend strength test and 120° C. heat resistance evaluation. The results obtained are shown in Table 1. In any cases, no irritating smell was generated in the 120° C. heat resistance evaluation.

The normal temperature bend strength was measured in accordance with JIS K6911.

In the 120° C. heat resistance evaluation, the molded plate was left to stand in an oven at 120° C. for 2 hours with a 20 g weight put on the center thereof. The plate taken out of the oven was placed on a flat mount, and the warpage of the periphery from the center was measured. The heat resistance was rated on an A-to-D scale according to the warpage.

A . . . No warpage.

B . . . The warpage was less than 1 mm. When the center was put on the ground.

C . . . The warpage was less than 2.5 mm. When the center was put on the ground.

D . . . The warpage was 2.5 mm or more. When the center was put on the ground.

TABLE 1

| | Number | Composition of molding composition (weight by part) | | | Normal temperature bend strength (kgf/cm$^2$) | 120° C. Heat resistance |
|---|---|---|---|---|---|---|
| | | A component | B or C component | D component | | |
| Example | 1 | 66 | 32.8 | 1.2 | 145 | A |
| | 2 | 66 | 32.8 | 1.2 | 150 | A |
| | 3 | 66 | 32.8 | 1.2 | 150 | A |
| | 4 | 66 | 32.8 | 1.2 | 140 | A |
| | 5 | 66 | 32.8 | 1.2 | 130 | A |
| | 6 | 66 | 32.8 | 1.2 | 145 | A |
| Comparative Example | 1 | 66 | 32.8 | 1.2 | 110 | B |
| | 2 | 66 | 32.8 | 1.2 | 120 | B |

It is seen from the results in Table 1 that all the molded plates of Examples 1 to 6 have no smell and sufficient strength and heat resistance for practical use.

In particular, the plates prepared from the molding compositions containing a crystalline nonlinear unsaturated polyester resin (Examples 1 to 4) or a crystalline nonlinear unsaturated polyester-polyamide resin (Example 6) are superior in strength and heat resistance to those from the comparative compositions containing a crystalline linear unsaturated polyester resin (Comparative Examples 1 and 2) and even to that from the composition containing a non-crystalline nonlinear unsaturated polyester resin (Example 5).

According to the present invention there are provided a molded article which has sufficient strength and heat resistance for practical use and is free from the problems of safety and smell and a molding composition suitable to produce such a molded article.

While the invention has been described in detail and with reference to specific examples thereof, it will be apparent to one skilled in the art that various changes and modifications can be made therein without departing from the spirit and scope thereof.

The entire disclosure of each and every foreign patent application from which the benefit of foreign priority has been claimed in the present application is incorporated herein by reference, as if fully set forth.

What is claimed is:

1. A molding composition comprising (A) a fibrous material, at least one of (B) a nonlinear unsaturated polyester and (C) a nonlinear unsaturated polyester-polyamide, and (D) a radical generator, wherein components (B) and (C) each contain 0.1 to 30% by weight of a tri- or higher polycarboxylic acid component based on the total constituent monomers.

2. The molding composition according to claim 1, wherein components (B) and (C) each have an iodine value of 40 or greater.

3. The molding composition according to claim 1, wherein components (B) and (C) each contain 0.1 to 30% by weight of a tri- or higher polyhydric alcohol component based on the total constituent monomers.

4. The molding composition according to claim 1, which comprises 29 to 99% by weight of component (A), 0.5 to 70% by weight, in total, of components (B) and (C), and 0.1 to 30% by weight of component (D).

5. The molding composition according to claim 1, wherein components (B) and (C) are each crystalline.

6. A molded article obtained by molding the molding composition as set forth in claim 1.

* * * * *